Dec. 24, 1963  E. FLOMEN ETAL  3,115,240
SAUSAGE CASING PACKAGING
Filed Aug. 17, 1961  2 Sheets-Sheet 1
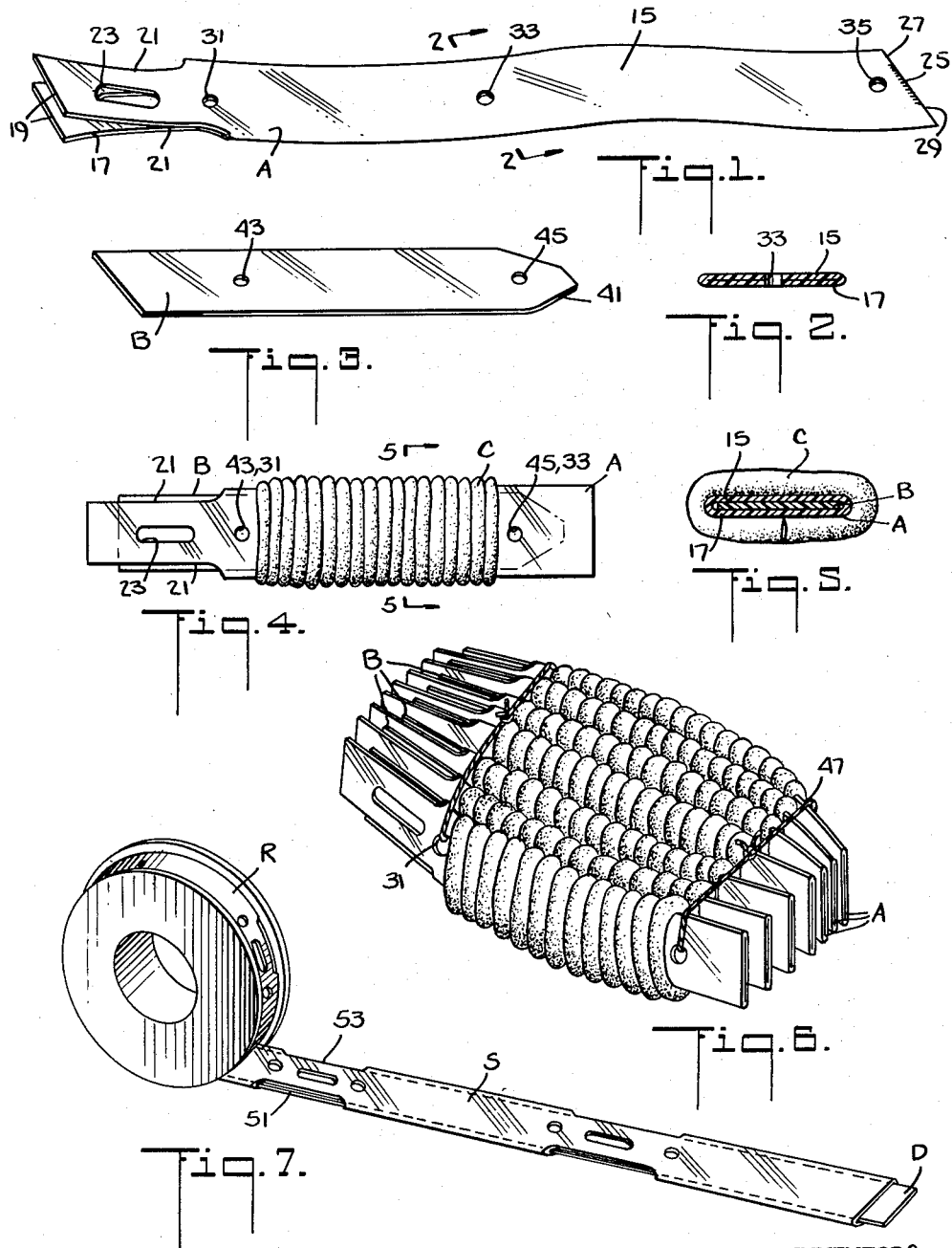
INVENTORS
EDWARD FLOMEN
STANISLAV VACLAV BRICH
BY  HARALD A. OSBERG
ATTORNEYS

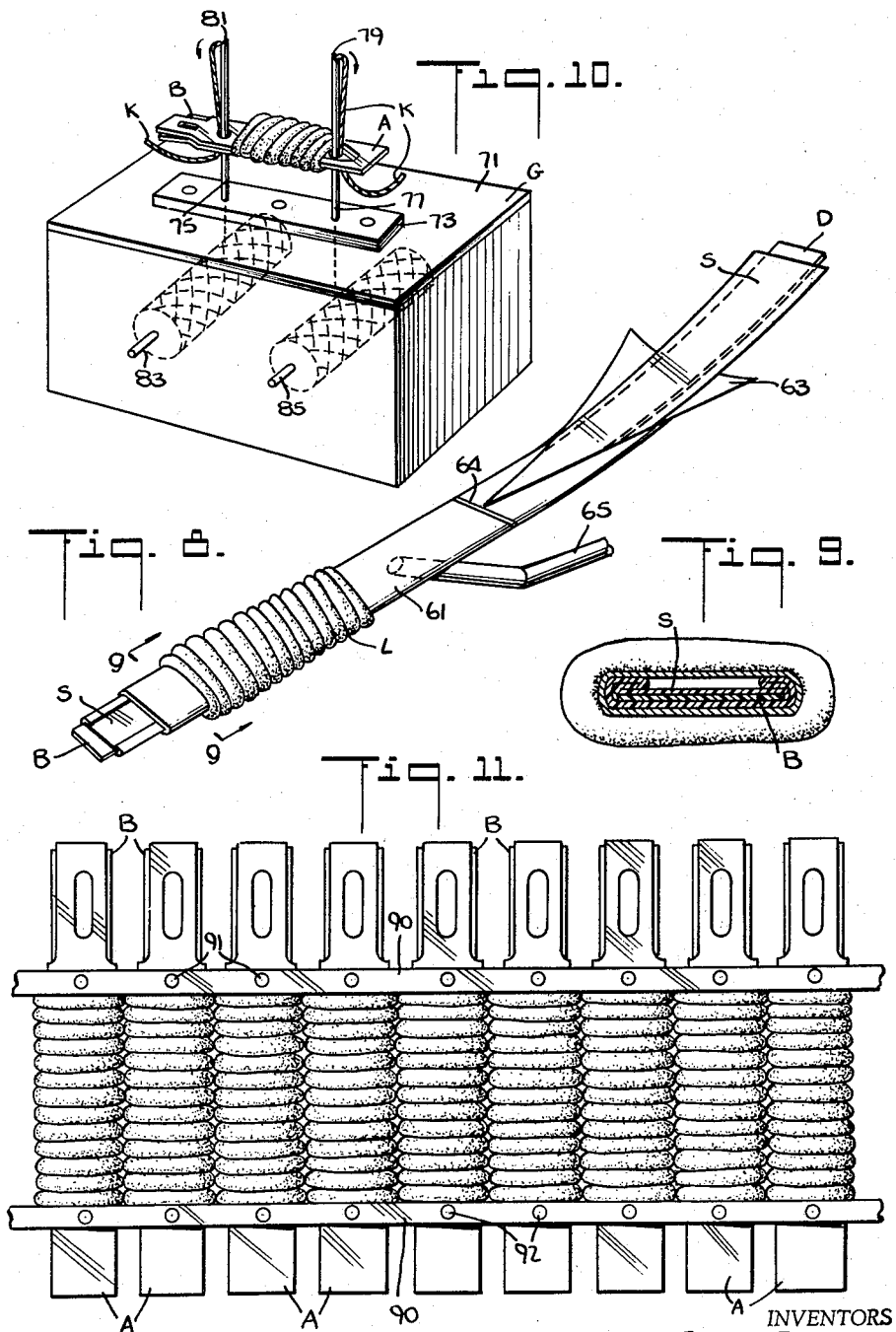

United States Patent Office 3,115,240
Patented Dec. 24, 1963

3,115,240
SAUSAGE CASING PACKAGING
Edward Flomen, Montreal West, Quebec, Stanislav Vaclav Brich, Montreal, Quebec, and Harald A. Osberg, Hampstead, Montreal, Quebec, Canada, assignors to Hygrade Food Products Corporation, Detroit, Mich., a corporation of New York
Filed Aug. 17, 1961, Ser. No. 132,193
Claims priority, application Canada Apr. 22, 1961
5 Claims. (Cl. 206—46)

This invention relates to methods of shirring and packaging natural gut sausage casings, and also to forms and holders for facilitating such packaging.

According to the commercial method of packaging now used, natural gut sausage casings are generally shipped in dry salted form, tied up in bundles, and packed in tierces with additional salt. Alternatively, they are shipped in hanks individually packed in plastic bags, and covered with additional salt or supersaturated salt brine.

The above methods are disadvantageous in several respects. Surplus salt often causes partial or total deterioration of casing gut tissue and thus leads to discoloration and lowered tensile strength. Poor salt penetration into the interior of the gut causes bacterial deterioration of the inner walls of the casing. Loss of moisture in packed casings can also be damaging as salt crystallization takes place, occasionally in the casing tissue itself, or in such a that the crystals formed penetrate the tissue and thus cause it to become excessively porous.

When casings are packed as described above, the casing user must soak the casings in warm water until they become soft. Then the of each strand must be found and shirred by hand or by machine onto a stuffing horn. The present commercial method thus involves the use of an excessive amount of labor on the part of the stuffer and wasteful amounts of salt as a curing agent, along with other disadvantages.

Accordingly, it is an object of this invention to provide a method of packaging natural gut sausage casings which is free from the above disadvantages.

It is another object of this invention to provide a novel holder which can be utilized to pack sausage casings.

It is a further object of this invention to provide a holder for packaging natural gut sausage casings adapted to permit formation of a pack from a plurality of individual package units.

It is another object of this invention to provide devices for facilitating use of the holder of this invention to form individual units of packaged casings and packs of such units.

The above objects and others are attained in accordance with the present invention. The preferred embodiment of the invention provides a pack of connected self-supporting units, each unit containing a holder supporting an individual strand of casing. Each unit is adapted to be placed over a stuffing horn, and thus the casing can be stuffed directly from the holder.

A holder, according to one form of the invention, embodies an elongated, flexible, self-supporting, flattened tube having opposed parallel walls. The tube is provided at one end with an ear having a slot to adapt it for attachment to a stuffing horn. The slot preferably goes through both walls of the tube. Preferably, the flattened tube is reinforced by a stiffener insert in the shape of a flat, elongated, semi-rigid narrow strip having one end tapered to facilitate entry into the flattened tube.

A sausage casing unit, according to the invention, comprises a holder, as described above, with a length of sausage casing gut shirred onto it. After the gut is shirred onto the holder, part of the holder may be cut off to make it shorter. In a preferred form of the invention the flattened tube and insert strip have registering sets of eyes located at opposite ends to permit formation of a pack of units. Thus, several units may be connected together by laces extending through the connecting eyes.

The invention contemplates an apparatus for assembling sausage casing units in the above manner which comprises a pair of syringes through which laces are led in combination with a source of supply of lace, the syringes being adapted to enter the sets of registering eyes in the unit and lead the lace through them.

A pack of units may also be formed by using strips of thermoplastic material which extend between the respective units and which may be heat sealed to the units.

A preferred method of practicing the inventtion involves use of a continuous strip of sausage casing retaining holder. Such holder comprises a continuous flattened tube and a continuous stiffening insert extending through it. The strip has registering cut-outs at each side at intervals defining the ends of individual holders. Individual holders are formed from the continuous length merely by severing at the cut-outs. In use, the continuous strip is fed from a supply roll, a length of gut shirred onto the next succeeding holder to form a unit, and the unit separated from the strip by cutting.

The invention also contemplates a device to facilitate shirring the sausage casing gut onto the individual holders produced from the continuous strip. This device is basically a feeding channel through which the continuous holder strip is fed. A length of casing gut is shirred on the outside of the channel for sliding off onto the continuous holder strip as it is fed. The feed end of the channel is flared to facilitate entry of the holder strip. Desirably the channel is of a width slightly less than that of the continuous holder strip so that the edges of the latter are infolded as they are fed into the channel from the funnel and remain infolded until the gut is shirred on.

The packs of units are then packaged in brine or other suitable liquid. If desired, the liquid can be a curing solution, so that the curing process may be effected during shipping or storage time.

The invention has been generally described and it will now be referred to in more detail by reference to the accompanying drawings which illustrate preferred embodiments of it and in which:

FIGURE 1 is a perspective view of a sausage casing gut holder according to the invention;

FIGURE 2 is a cross-sectional elevational view of the holder of FIGURE 1;

FIGURE 3 is a perspective view of a stiffener insert to be used in the holder of FIGURE 1;

FIGURE 4 is a plan view of a sausage casing unit made up of the form shown in FIGURE 1 having within it the insert shown in FIGURE 3 and having shirred onto it a length of sausage casing gut;

FIGURE 5 is a cross-sectional elevational view of the unit of FIGURE 4;

FIGURE 6 is a perspective view of a pack of sausage casings made up of a plurality of the units shown in FIGURE 4;

FIGURE 7 is a perspective view showing a roll of a continuous length of sausage casing supporting strip and stiffener insert;

FIGURE 8 is a perspective view of a device adapted for shirring sausage casing guts on a holder in continuous strip form;

FIGURE 9 is a cross-sectional elevational view of the device of FIGURE 8;

FIGURE 10 is a perspective view showing an apparatus suitable for assembling sausage casing units into a pack according to the invention; and FIGURE 11 is a plan view showing an alternative form of pack according to the invention.

Referring more particularly to FIGURES 1 and 2 of the drawings, a preferred holder for use in accordance with this invention is shown as A in FIGURE 1. This holder is an elongated, flexible, semi-rigid, flattened tube, constructed, for example, of a plastic material such as polyethylene. This tube has opposing walls 15 and 17. At least one of these walls, preferably both, is provided at one end with an ear 19 which can be provided in the manufacturing of the form by cut-outs 21. The ear 19 is provided with a slot 23 which is adapted to engage a hook on a stuffing horn.

In the conventional manner of shirring the sausage gut onto the holder, the holder is disposed on a shirring horn (not shown). To prevent the holder tube from "riding up" on the shirring horn during the shirring operation, the end opposite the ear is closed for example by heat sealing, as shown by reference number 25 in FIGURE 1. As indicated, liquid escape openings 27 and 29 are provided at each side of the closure. These openings are provided to prevent the holder from filling with liquid which is present during the shirring operation. Such liquid is utilized to inflate and flush the sausage gut during this step.

For use in assembling units into packs, the walls 15 and 17 are also provided with sets of registering eyes 31, 33 and 35. The eyes 31, 33 and 35 are provided to facilitate formation of packs of units as described in detail below. Only two sets of eyes are used. However, three sets are provided should the casings vary in length thereby increasing or decreasing the holder surface which is covered with gut.

FIGURE 3 illustrates a preferred form of stiffener insert which is placed inside the holder for the purpose of reinforcing it. This insert is made up of an elongated body B slightly narrower in width than that of tube A and provided with a tapered end 41. The insert B has eyes 43 and 45 adapted to register with the eyes 31 and 33 of tube A to facilitate forming a pack of several units. Should longer units be needed, the insert B would extend in length so that it would have eyes which register with eyes 31 and 35.

FIGURES 4 and 5 show a sausage casing unit comprising a holder comprising flattened tube A and insert B. The flattened tube A is shown with the insert B inside it and a sausage casing gut C shirred onto the holder so formed. The flattened tube as shown in FIGURE 1 is considerably longer than the eventual cut form as shown in FIGURE 4. The unused length is provided to facilitate shirring of the gut casing onto it. The actual length will depend, to some extent, on the length of the casing. For example, a tube to carry an eight yard casing will usually be only about half as long as that to carry a 16-yard casing.

In accordance with one aspect of the invention, a number of these units may be assembled together into a pack as shown in FIGURE 6 and the pack held together by laces 47 extending through the eyes of the unit.

The holder may be conveniently supplied in continuous strip form as shown in FIGURE 7. The strip is formed into a roll R. In FIGURE 7, the continuous strip is shown with cutouts 51, 53, defining the ends of respective holders. The continuous flattened tube is noted by the letter S and the continuous reinforcing insert noted by the letter D in FIGURE 7. Individual holders are provided by merely cutting the continuous strip at appropriate intervals.

In order to facilitate the feeding of the continuous holder strip and the shirring onto it of sausage lengths, an apparatus as shown in FIGURES 8 and 9 is provided. This apparatus includes a channel 61 having on its receiving end a flared chute 63. The holder is introduced into channel 61 through chute 63. Water is piped through the inlet pipe 65 to facilitate movement of the gut onto the channel. The water travels along the length of the channel 61 accompanied by the strip.

A shirred length of casing L on the outside of channel 61 can be moved off onto the holder. The holder is cut at the appropriate place to form a single unit as shown in FIGURE 1.

In use, the continuous holder strip enters chute 63 and passes section 64 of the channel with sufficient clearance to resist leakage of water and still allow the passage of the tubing.

To facilitate the assembling of the sausage casing units into packs, an apparatus as shown in FIGURE 10 is provided. This apparatus in the preferred form shown is made up of a box G having a top 71, on which is mounted a base 73. Extending upwardly from the base 73 are a pair of syringes 75 and 77 which are hollow metal tubes having at their upper ends openings 79 and 81, respectively, provided with sharp edges. Beneath the top 71 and within the box are rolls of lace held on the shafts 83 and 85, respectively. The laces K are led up through the tubes 79 and 81. A number of the sausage casing units are impaled on the syrings 79 and 81 through an appropriate pair of eyes 31, 33 and 35 and the laces K led through them by the syringes. A suitable length of lacing K can be removed and used to tie the units together to form a pack, and the pack can then be removed from the impaling syringes.

FIGURE 11 shows an alternative form of sausage casing pack according to the invention. In this form, a number of sausage casing units as shown in FIGURE 4 are held together by two strips 90 of thermoplastic material which are "spot-welded" as at 91 and 92 to the respective units which are also formed of thermoplastic material. This is done by any conventional heat-sealing method which fuses the material of the strip 90 as well as the material of the tube A and thus welds the material of the strip 90 to the material of the tube A. The entire assembly can be accordion-folded so that the units are side by side. The units can be readily separated from the bundle by severing the strips 90.

The flexible holder A may be made, for example, by extrusion from a suitable non-toxic plastic material, for example, polyethylene terephthalate resin, for instance that sold under the trademark "Mylar," a polyethylene or polypropylene. Alternatively, it may be heat-sealed out of plastic tape. The holder should be pliable and should not offer any substantial resistance to bending when handling. A preferred wall-thickness is between about 1 to 12 mils.

The insert B is preferably resilient in the sense of flexibility, but not in the sense of being pliable like the tube A. The insert B can also be made from polyethylene. A preferred thickness is between about 6 to 20 mils.

An example of a typical tube A would be 1 inch wide by 8 inches in length, and 2 mils in wall thickness. A typical insert B would be 10 mils in thickness, its width would be about ⅞ of an inch and its length would depend on the length of the tube. Normally, it would be about the same length as the cut tube.

The holder of this invention may be formed of two different gauge plastic sheets, so that one wall is of greater stiffness than the other. In such instance, it would be convenient to form the holder by sealing two walls together.

In connection with forming a holder by sealing two films, it may be advantageous to seal the holder around the insert, thereby eliminating the need for inserting the stiffener at a subsequent stage of the process.

Typical packs contain about 12 units. However, the number of units which can conveniently be formed into a pack depends on the diameter and length of the casings shirred onto the respective holders.

The packs of units may be put up for storage and sale in containers varying in size from small plastic bags up to barrels depending on quantity. When placed in the containers, the packs may be immersed in a special conditioning and curing solution. The composition of the solution may be chosen to preserve the casing during storage and shipping as will be understood by one skilled in the art. This solution is also effective in keeping the casing moist and slippery so that it will slide easily off the holder onto a stuffing horn when it is being shipped and otherwise handled. If the gut has been cured prior to packaging, then it may be shipped in a solution, such as brine, which will serve merely as a preservative.

It is to be understood that the examples provided above are merely intended as illustrative of the present invention, and that variations may be made by one skilled in the art without departing from the spirit and scope of this invention.

We claim:

1. A holder for retaining sausage casing gut comprising an elongated flexible, self-supporting flattened tube having opposed parallel walls, said tube being provided at one end with an ear having a slot therein, and the other end of said tube being partially closed to provide minor liquid escape openings.

2. A holder for retaining sausage casing gut comprising an elongated flexible, self-supporting flattened tube having opposed parallel walls, said tube being provided at one end with an ear having a slot therein, and a flat elongated semi-rigid strip located between said walls.

3. A holder for retaining sausage casing gut comprising an elongated flexible, self-supporting flattened tube having opposed parallel walls, said tube being provided at one end with an ear having a slot therein, said walls of the tube being provided with at least two sets of registering eyes at spaced intervals along the length of said tube, and a flat elongated semi-rigid strip located between said walls, said strip being slightly narrower in width than said tube and being provided with sets of eyes registering with the eyes of said tube.

4. A continuous strip of sausage casing holder comprising a continuous elongated, flexible, self-supporting flattened tube having opposed parallel walls, said strip being provided at spaced intervals with a pair of corresponding cutouts at the edges thereof, said strip also being provided with at least two sets of registering eyes for each pair of cut-outs, and a continuous flat elongated semi-rigid strip located between said parallel walls, said strip being slightly narrower in width than said tube and being provided with eyes which register with the eyes of said tube.

5. A holder for retaining sausage casing gut comprising an elongated flexible, self-supporting flattened tube having opposed parallel walls, and a flat elongated semi-rigid strip located between said walls.

References Cited in the file of this patent

UNITED STATES PATENTS

| | | |
|---|---|---|
| 1,488,698 | Mumm et al. | Apr. 1, 1924 |
| 1,507,696 | Tosadori | Sept. 9, 1924 |
| 1,538,460 | Brecht | May 19, 1925 |
| 1,876,279 | Dietrich | Sept. 6, 1932 |
| 3,064,803 | Eichin et al. | Nov. 20, 1962 |

FOREIGN PATENTS

| | | |
|---|---|---|
| 537,706 | Canada | Mar. 5, 1957 |